(12) United States Patent
A et al.

(10) Patent No.: US 11,140,200 B1
(45) Date of Patent: Oct. 5, 2021

(54) DISTRIBUTING A NETWORK POLICY USING CONNECTIVITY FAULT MANAGEMENT

(71) Applicant: Juniper Networks, Inc., Sunnyvale, CA (US)

(72) Inventors: Vamsi Krishna A, Bangalore (IN); Paleti Venkata Ramana, Bangalore (IN); Prabhu Raj V. K., Bangalore (IN); Viswanath K J, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 527 days.

(21) Appl. No.: 15/891,084

(22) Filed: Feb. 7, 2018

Related U.S. Application Data (60) Provisional application No. 62/612,064, filed on Dec. 29, 2017.

(51) Int. Cl.
*H04L 29/06* (2006.01)
*H04L 12/24* (2006.01)

(52) U.S. Cl.
CPC .......... *H04L 63/20* (2013.01); *H04L 41/0627* (2013.01); *H04L 41/0806* (2013.01); *H04L 41/0893* (2013.01)

(58) Field of Classification Search
CPC . H04L 63/20; H04L 41/0627; H04L 41/0893; H04L 41/0806; H04L 41/0672; G06F 7/24; G06F 17/30
USPC .......................................................... 726/1
See application file for complete search history.

(56) References Cited

U.S. PATENT DOCUMENTS

| | | | |
|---|---|---|---|
| 7,843,845 B2 | 11/2010 | Sridhar et al. | |
| 9,258,237 B1* | 2/2016 | Smith | .................. H04L 12/4633 |
| 9,497,074 B2 | 11/2016 | Saltsidis | |
| 9,602,354 B1* | 3/2017 | Esale | .................. H04L 41/0893 |
| 10,044,606 B2* | 8/2018 | Mishra | ................ H04L 43/0811 |
| 10,491,318 B1* | 11/2019 | Alevoor | ............. H04J 14/0283 |

(Continued)

FOREIGN PATENT DOCUMENTS

| | | |
|---|---|---|
| WO | WO 2014/030893 A1 | 2/2014 |
| WO | WO 2014/077544 A1 | 5/2014 |

OTHER PUBLICATIONS

Institute of Electrical and Electronics Engineers, Inc., "Interpretation for IEEE Std 802.1ag™—2007 IEEE Standard for Local and Metropolitan Area Networks—Virtual Bridged Local Area Networks Amendment 5: Connectivity Fault Management", http://standards.ieee.org/findstds/interps/802.1ag.html, 2011, 2 pages.

(Continued)

*Primary Examiner* — Farid Homayounmehr
*Assistant Examiner* — Sanchit K Sarker
(74) *Attorney, Agent, or Firm* — Harrity & Harrity, LLP (57) ABSTRACT

A device may receive a network policy, the network policy specifying: a matching criteria and an action to be performed on network traffic that matches the matching criteria. The device may generate type-length-value (TLV) data based on the network policy, a value portion of the TLV data including data specifying the network policy. In addition, the device may add the TLV data to a Connectivity Fault Management (CFM) packet and transmit the CFM packet to a separate device to cause the network policy to be implemented on the separate device.

20 Claims, 7 Drawing Sheets

(56) References Cited

U.S. PATENT DOCUMENTS

| | | | |
|---|---|---|---|
| 2004/0030765 A1 | 2/2004 | Zilbershtein et al. | |
| 2006/0034171 A1* | 2/2006 | Rajsic | H04L 49/256 370/235 |
| 2007/0204324 A1 | 8/2007 | Roberts et al. | |
| 2009/0116497 A1* | 5/2009 | Varma | H04L 12/413 370/401 |
| 2010/0238808 A1* | 9/2010 | Salam | H04L 12/4641 370/241.1 |
| 2010/0290345 A1* | 11/2010 | Gero | H04L 43/0811 370/241.1 |
| 2012/0087232 A1* | 4/2012 | Hanabe | G06F 11/2002 370/217 |
| 2014/0133289 A1* | 5/2014 | Jadav | H04L 41/0672 370/216 |
| 2014/0344444 A1* | 11/2014 | Wu | H04L 61/2015 709/224 |
| 2015/0326469 A1* | 11/2015 | Kern | H04L 43/10 370/254 |
| 2016/0007366 A1* | 1/2016 | Li | H04L 47/58 370/329 |
| 2016/0065407 A1 | 3/2016 | Saltsidis | |
| 2016/0077800 A1* | 3/2016 | Zaidi | G06F 7/24 707/741 |
| 2016/0308962 A1* | 10/2016 | Hegde | H04L 67/1095 |
| 2016/0373349 A1* | 12/2016 | Porat | H04L 45/38 |

OTHER PUBLICATIONS

Cisco Systems, Inc., "Carrier Ethernet Configuration Guide, Cisco IOS XE Everest 16.6.1 (Cisco ASR 900 Series)", Jul. 30, 2017, 280 pages.

Congdon et al., "802.1AB Overview Link Layer Discovery Protocol", Sep. 30, 2004, 17 pages.

* cited by examiner

DISTRIBUTING A NETWORK POLICY USING CONNECTIVITY FAULT MANAGEMENT

CROSS-REFERENCE TO RELATED APPLICATIONS

This application claims priority under 35 U.S.C. § 119 to U.S. Provisional Patent Application No. 62/612,064, filed on Dec. 29, 2017, the content of which is incorporated by reference herein in its entirety.

BACKGROUND

Network devices, such as routers, switches, firewalls, or the like, often handle network traffic in the form of network packets (e.g., data packets) that are transmitted between network entities (e.g., devices operating on a network). Some network devices implement Ethernet Connectivity Fault Management (CFM), IEEE 802.1ag, which is an end-to-end per-service-instance Ethernet layer operation, administration, and management (OAM) protocol that may be implemented by network devices to provide proactive network connectivity monitoring, fault verification, and fault isolation for Ethernet networks. In addition, network devices may implement network policies designed to protect various network entities from a variety of potential threats, such as malware, hacking attempts, denial of service attacks, unauthorized access, or the like. Network policies may, for example, cause network devices to inspect network traffic, including individual network packets, to determine whether potential threats exist and, if so, how the network packets should be handled.

SUMMARY

According to some implementations, a device may comprise: one or more input components; and one or more processors to: receive, via at least one of the one or more input components, first data specifying a network policy, the first data specifying: a matching criteria, and an action to be performed on network traffic that matches the matching criteria; generate type-length-value (TLV) data based on the network policy, a value portion of the TLV data including second data specifying the network policy; add the TLV data to a Connectivity Fault Management (CFM) packet; and transmit the CFM packet to a separate device to cause the network policy to be implemented on the separate device.

According to some implementations, a network device may comprise: one or more input components; and one or more processors to: receive a Connectivity Fault Management (CFM) packet from a separate network device; identify type-length-value (TLV) data included in the CFM packet, a value portion of the TLV data including data specifying: a matching criteria, and an action; generate a network policy based on the TLV data, the network policy including: the matching criteria, and the action; and apply the network policy.

According to some implementations, a method may comprise: receiving, by a network device, first data specifying a network policy, the first data specifying a matching criteria and an action; adding, by the network device, second data to a Connectivity Fault Management (CFM) packet, the second data specifying the matching criteria and the action; and transmitting, by the network device, the CFM packet to a separate network device to cause the separate network device to apply the network policy based on the CFM packet.

DETAILED DESCRIPTION

The following detailed description of example implementations refers to the accompanying drawings. The same reference numbers in different drawings may identify the same or similar elements.

Network devices, such as switches, routers, firewalls, or the like, often use network policies to filter or otherwise take action on network packets that are handled by the network devices in the course of forwarding and/or routing the network packets to their intended destination. The network policies are typically created by network administrators and often, when a network policy is implemented on one network device within a network, network administrators will repeat the creation and deployment of the network policies on other network devices for which the network administrators are responsible. Applying network policies to many network devices may be a relatively large burden for network administrators to undertake and, in some situations, network administrators may not have access to network devices on which the network polices should be implemented. In addition, in the time taken to apply a network policy to multiple network devices, a threat to one network device (for which the network policy was designed to protect) may spread to other network devices before the network policy may be implemented on the other network devices.

Some implementations, described herein, provide a network device that is capable of using organization specific Type-Length-Value (TLV) data to spread network policies to other network devices using Connectivity Fault Management (CFM) packets. For example, a network device may have active CFM sessions between the network device and other network devices. When a network policy is implemented on the network device, the network device may generate TLV data that specifies the network policy and include the TLV data in a CFM packet to be transmitted to other network devices implementing CFM. In some implementations, the network device may transmit the TLV data in a continuity check message (CCM) packet that is periodically provided to peer network devices (e.g., other network devices with which the network device has an active CFM session). In some implementations, the network device may transmit the TLV data in an Ethernet Alarm Indication Signal (ETH-AIS) packet that can be transmitted to network devices that implement CFM but are not direct peers of the network device sending the ETH-AIS packet. Network devices that receive CFM packets may identify a network policy included in a TLV field of the CFM, e.g., based on the format of the TLV data. After receiving the network policy, the network device may implement the network policy.

In this way, a network device may be capable of distributing network policies to other network devices using CFM packets, enabling the recipient network devices to implement the network policies as well. The ability to distribute network policies using CFM may facilitate relatively quick distribution of network policies in a manner designed to minimize the involvement of a network administrator or other mechanisms for distributing network policies. The ability to quickly distribute (and end) network policies may increase the likelihood that network policies may be spread quickly enough to secure other network devices before the threats can spread. By using an existing CFM session and CFM protocol, the distribution of network policies may be compatible with many network devices, both within and outside of the administrative domain that includes the network device on which the network policy first implemented. Accordingly, network devices that distribute network policies using CFM may conserve significant resources, both human resource and computing resources, which might otherwise be spent on activating and deactivating network policies on various network devices.

As used herein, a network packet, or packet, may refer to a communication structure for communicating information, such as a protocol data unit (PDU), a data packet, a frame, a datagram, a segment, a message, a block, a cell, a frame, a subframe, a slot, a symbol, a portion of any of the above, and/or another type of formatted or unformatted unit of data capable of being transmitted via a network.

Figure 1A:
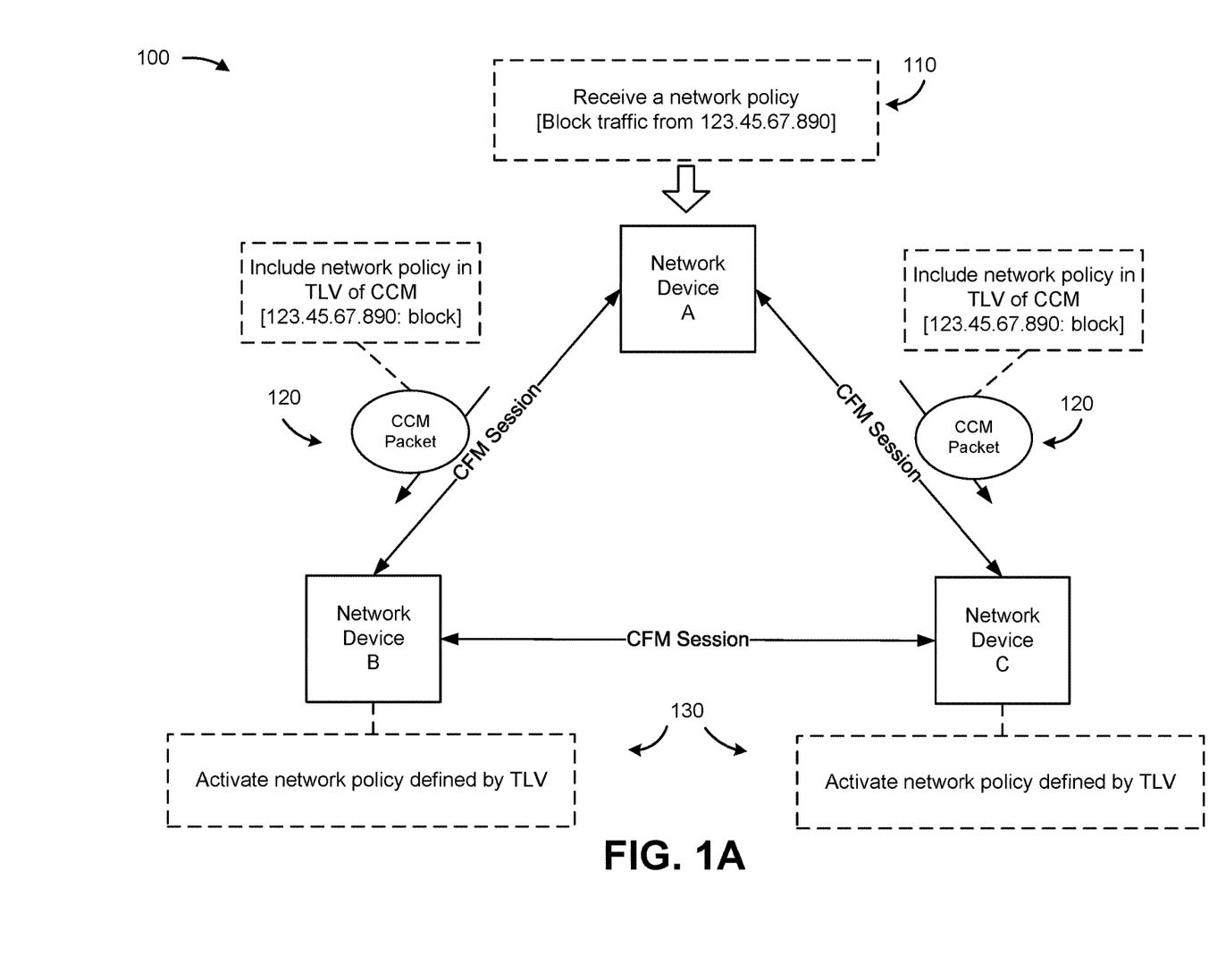
FIG. 1A is a diagram of an overview of example implementation described herein.

FIG. 1A is a diagram of an overview of an example implementation 100 described herein. As shown in FIG. 1A, example implementation 100 may include three network devices, e.g., network device A, network device B, and network device C. Each network device may include, for example, a router, a switch, a firewall, a load balancing device, a network security device, a network monitoring device, and/or the like. Each of the network devices is connected to each of the other network devices, e.g., via a network, and active CFM sessions are established between the network devices (e.g., in a manner designed to handle potential network faults, such as one of the network devices becoming inactive).

As further shown in FIG. 1A, and by reference number 110, network device A receives a network policy. The network policy may be received, for example, from a network administrator that applied the network policy to network device A, from another component of network device A, such as an intrusion detection component that identified a policy to implement in response to a threat, from a management device, such as a network management device in communication with network device A, and/or the like. In the example implementation 100, the network policy indicates that network traffic associated with the network address 123.45.67.890 should be blocked.

As further shown in FIG. 1A, and by reference numbers 120, network device A transmits the network policy to network devices B and C. Network device A transmits the network policy by generating TLV data that specifies the network policy (e.g., that network traffic from network address 123.45.67.890 should be blocked). In the example implementation 100, the TLV data is included in a CCM packet, which is a packet designed to provide a "heartbeat," or indication that network device A is operational. CCM packets are periodically transmitted by a network device to the CFM peer devices of the network device which, in the example implementation, includes network devices B and C.

As further shown in FIG. 1A, and by reference numbers 130, network devices B and C activate the network policy specified by the TLV data. For example, based on receiving a CCM packet that includes TLV data, network device B (and/or network device C) may determine (e.g., based on the format of the TLV data matching a predefined format for network policies) that the TLV data includes information specifying a network policy. After determining that the TLV data included in the CCM packet specifies a network policy, network device B (and/or network device C) may generate and activate the same network policy, e.g., a policy designed to block network traffic associated with the network address 123.45.67.890. In this way, network device A distributes the network policy to the CFM peer devices of network device A, which includes network devices B and C.

Figure 1B:
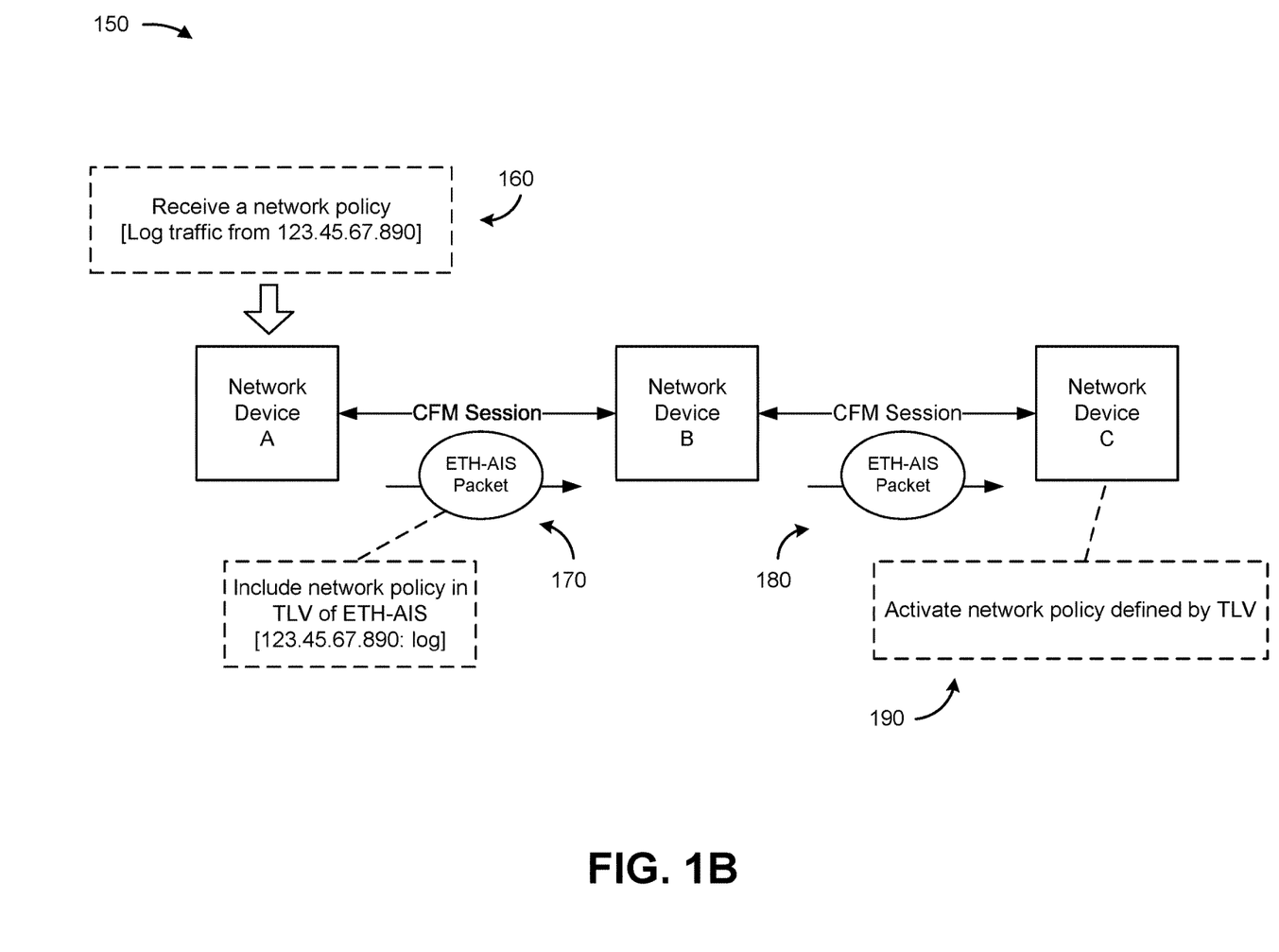
FIG. 1B is diagram of an overview of another example implementation described herein.

FIG. 1B is a diagram of an overview of another example implementation 150 described herein. As shown in FIG. 1B, example implementation 150 may include three network devices, e.g., network device A, network device B, and network device C. Each network device may be the same as or similar to the network devices described in example implementation 100, with respect to FIG. 1A. In the example implementation 150, two CFM sessions exist, one between network devices A and B, and another between network devices B and C.

As further shown in FIG. 1B, and by reference number 160, network device A receives a network policy. The network policy may be received, for example, in a manner similar to that described above with respect to reference number 110 (e.g., from a network administrator, from another component of network device A, from a management device, and/or the like). In the example implementation 100, the network policy indicates that network traffic associated with the network address 123.45.67.890 should be logged.

As further shown in FIG. 1B, and by reference number 170, network device A transmits the network policy to network device B. Network device A transmits the network policy by generating TLV data that specifies the network policy (e.g., that network traffic from network address 123.45.67.890 should be logged). In the example implementation, network device A includes the TLV data in an ETH-AIS packet, which is a packet designed to alert network devices regarding a potential network device outage. While depicted as providing the TLV data to network device B in an ETH-AIS packet, in some implementations, network device A may provide the TLV data to network device B in a CFM/CCM packet (e.g., in an organization-specific TLV field of the CCM packet).

As further shown in FIG. 1B, and by reference number 180, network device B transmits the ETH-AIS packet to network device C. In implementations where network device A provides the TLV data to network device B in a CFM/CCM packet, network device B may generate an ETH-AIS packet that includes the TLV data (e.g., to send the ETH-AIS packet to CFM peers of network device B. Network device B may be configured to automatically transmit an ETH-AIS packet to network devices that are CFM peers of network device B. In the example implementation 150, network device C is a CFM peer of network device B, which may cause network device B to transmit the ETH-AIS packet to network device C. While not shown in example implementation 150, in some implementations, network device B may activate the network policy (e.g., to log network traffic associated with network address 123.45.67.890) by identifying the TLV data included in the ETH-AIS packet (e.g., in a manner similar to that described above with respect to the CCM packet and reference numbers 130).

As further shown in FIG. 1B, and by reference number 190, network device C activates the network policy specified by the TLV data. For example, based on receiving an ETH-AIS packet that includes TLV data, network device C may determine (e.g., based on the format of the TLV data matching a predefined format for network policies) that the TLV data includes information specifying a network policy. After determining that the TLV data included in the ETH-AIS packet specifies a network policy, network device C may generate and activate the same network policy, e.g., a policy designed to log network traffic associated with the network address 123.45.67.890. In this way, network device A distributes the network policy to other network devices using the CFM protocol, which includes network device C (and in some implementations network device B).

In this way, a network device may be capable of distributing network policies to other network devices using CFM packets, enabling the recipient network devices to implement the network policies as well. The ability to distribute network policies using CFM may facilitate relatively quick distribution of network policies in a manner designed to minimize the involvement of a network administrator or other mechanisms for distributing network policies. The ability to quickly distribute (and end) network policies may increase the likelihood that network policies may be spread quickly enough to secure other network devices before the threats can spread. By using an existing CFM session and CFM protocol, the distribution of network policies may be compatible with many network devices, both within and outside of the administrative domain that includes the network device on which the network policy is first implemented. Accordingly, network devices that distribute network policies using CFM may conserve significant resources, both human resource and computing resources, which might otherwise be spent on activating and deactivating network policies on various network devices.

As indicated above, FIGS. 1A and 1B are provided merely as examples. Other examples are possible and may differ from what was described with regard to FIGS. 1A and 1B.

Figure 2:
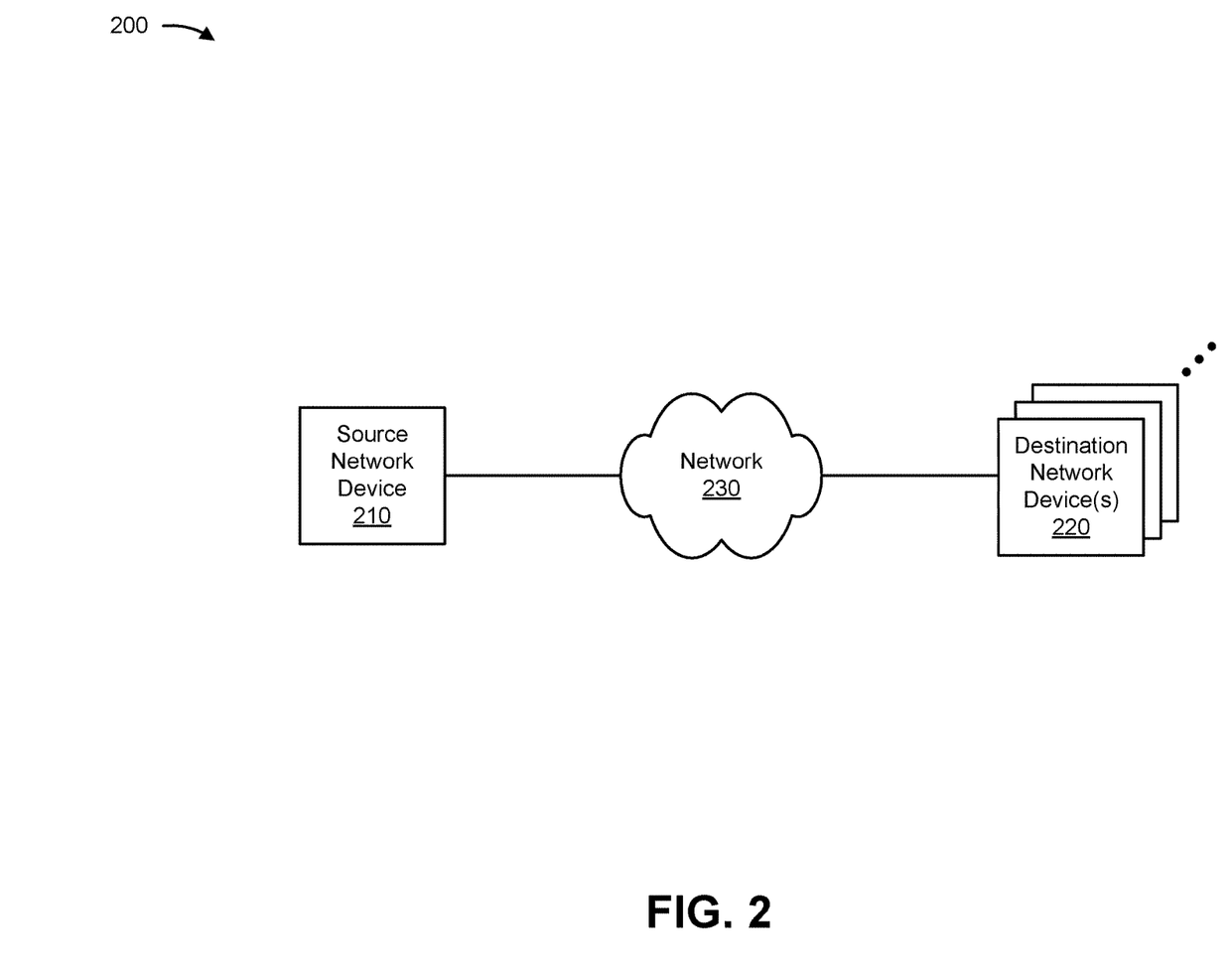
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include source network device 210, destination network device(s) 220, and a network 230. Devices of environment 200 may interconnect via wired connections, wireless connections, or a combination of wired and wireless connections.

Source network device 210 includes one or more devices capable of receiving, generating, storing, processing, and/or providing information associated with network policies. For example, source network device 210 may include a firewall, a router, a gateway, a switch, a hub, a bridge, a reverse proxy, a server (e.g., a proxy server), a security device, an intrusion detection device, a load balancer, or a similar device. In some implementations, source network device 210 may operate as an edge device of a network, such as a provider edge device of a service provider network and/or a customer edge device in communication with one or more provider edge devices. Source network device 210 may be capable of receiving network policies (e.g., via user input and/or based on a component of source network device 210), generating TLV data, and including the TLV data in a CCM packet and/or an ETH-AIS packet for transmission to another device via network 230, such as destination network device(s) 220. In some implementations, source network device 210 may be a physical device implemented within a housing, such as a chassis. In some implementations, source network device 210 may be a virtual device implemented by one or more computer devices of a cloud computing environment or a data center.

Destination network device 220 includes one or more devices capable of receiving, generating, storing, processing, and/or providing information associated with network policies. In some implementations, the destination network device 220 may be the same as or similar to the source network device 210. For example, destination network device 220 may include a firewall, a router, a gateway, a switch, a hub, a bridge, a reverse proxy, a server (e.g., a proxy server), a security device, an intrusion detection device, a load balancer, or a similar device. In some implementations, destination network device 220 may operate as a core device of a network, such as a provider core device of a service provider network and/or a customer core device in communication with one or more provider edge devices. Destination network device 220 may be capable of generating network policies based on TLV data provided via a CCM packet and/or ETH-AIS packet, e.g., from source network device 210 via network 230. In some implementations, destination network device 220 may be a physical device implemented within a housing, such as a chassis. In some implementations, destination network device 220 may be a virtual device implemented by one or more computer devices of a cloud computing environment or a data center.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
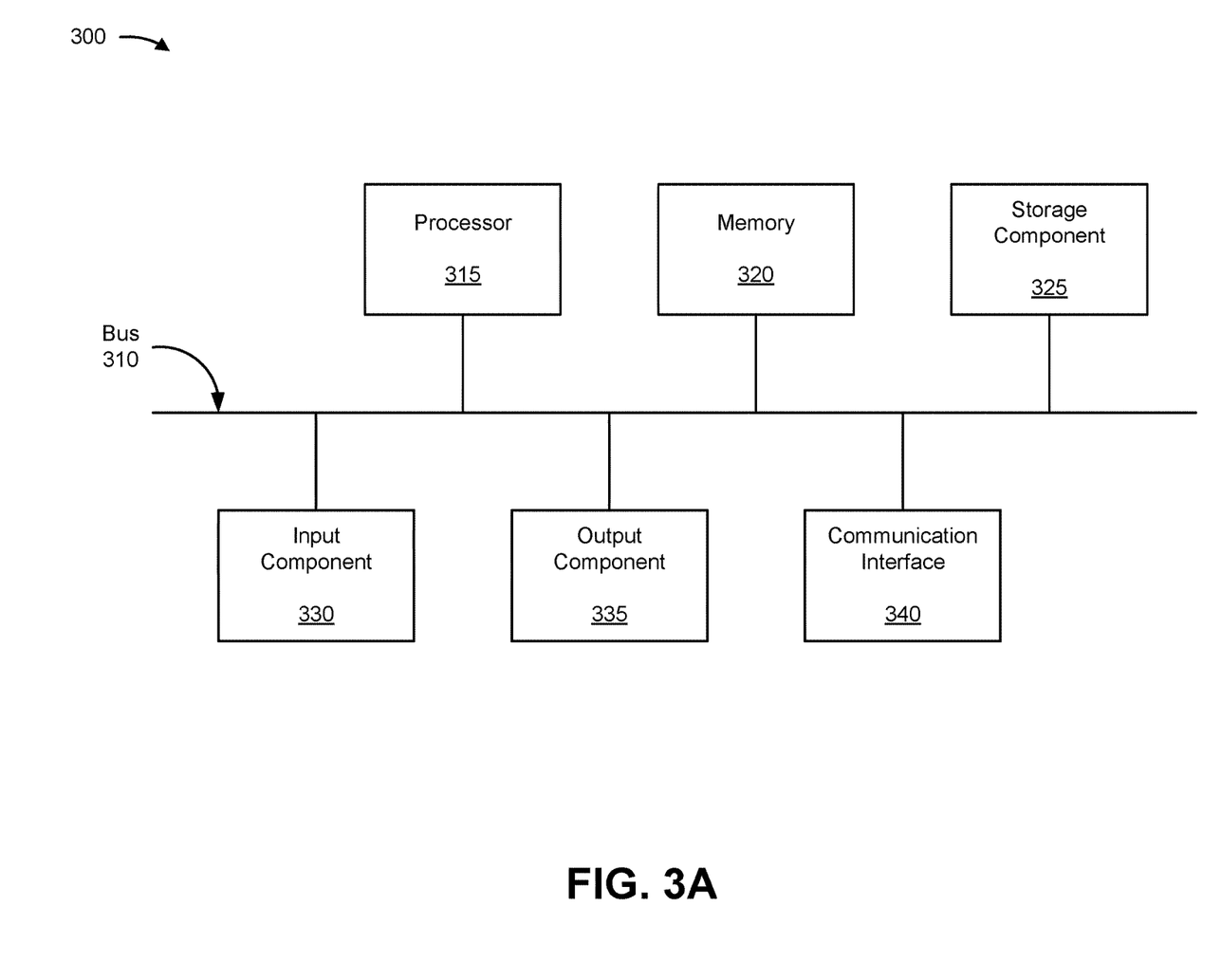
FIG. 3A is a diagram of example components of one or more devices of FIG. 2.

FIG. 3A is a diagram of example components of a device 300. Device 300 may correspond to a source network device 210 and/or destination network device 220. In some implementations, source network device 210 and/or destination network device 220 may include one or more devices 300 and/or one or more components of device 300. As shown in FIG. 3A, device 300 may include a bus 310, a processor 315, a memory 320, a storage component 325, an input component 330, an output component 335, and a communication interface 340.

Bus 310 includes a component that permits communication among the components of device 300. Processor 315 is implemented in hardware, firmware, or a combination of hardware and software. Processor 315 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 315 includes one or more processors capable of being programmed to perform a function. Memory 320 includes a random access memory (RAM), a read only memory (ROM), and/or another type of dynamic or static storage device (e.g., a flash memory, a magnetic memory, and/or an optical memory) that stores information and/or instructions for use by processor 315.

Storage component 325 stores information and/or software related to the operation and use of device 300. For example, storage component 325 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 330 includes a component that permits device 300 to receive information, such as via user input (e.g., a touch screen display, a keyboard, a keypad, a mouse, a button, a switch, and/or a microphone). Additionally, or alternatively, input component 330 may include a sensor for sensing information (e.g., a global positioning system (GPS) component, an accelerometer, a gyroscope, and/or an actuator). Output component 335 includes a component that provides output information from device 300 (e.g., a display, a speaker, and/or one or more light-emitting diodes (LEDs)).

Communication interface 340 includes a transceiver-like component (e.g., a transceiver and/or a separate receiver and transmitter) that enables device 300 to communicate with other devices, such as via a wired connection, a wireless connection, or a combination of wired and wireless connections. Communication interface 340 may permit device 300 to receive information from another device and/or provide information to another device. For example, communication interface 340 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 315 executing software instructions stored by a non-transitory computer-readable medium, such as memory 320 and/or storage component 325. A computer-readable medium is defined herein as a non-transitory memory device. A memory device includes memory space within a single physical storage device or memory space spread across multiple physical storage devices.

Software instructions may be read into memory 320 and/or storage component 325 from another computer-readable medium or from another device via communication interface 340. When executed, software instructions stored in memory 320 and/or storage component 325 may cause processor 315 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
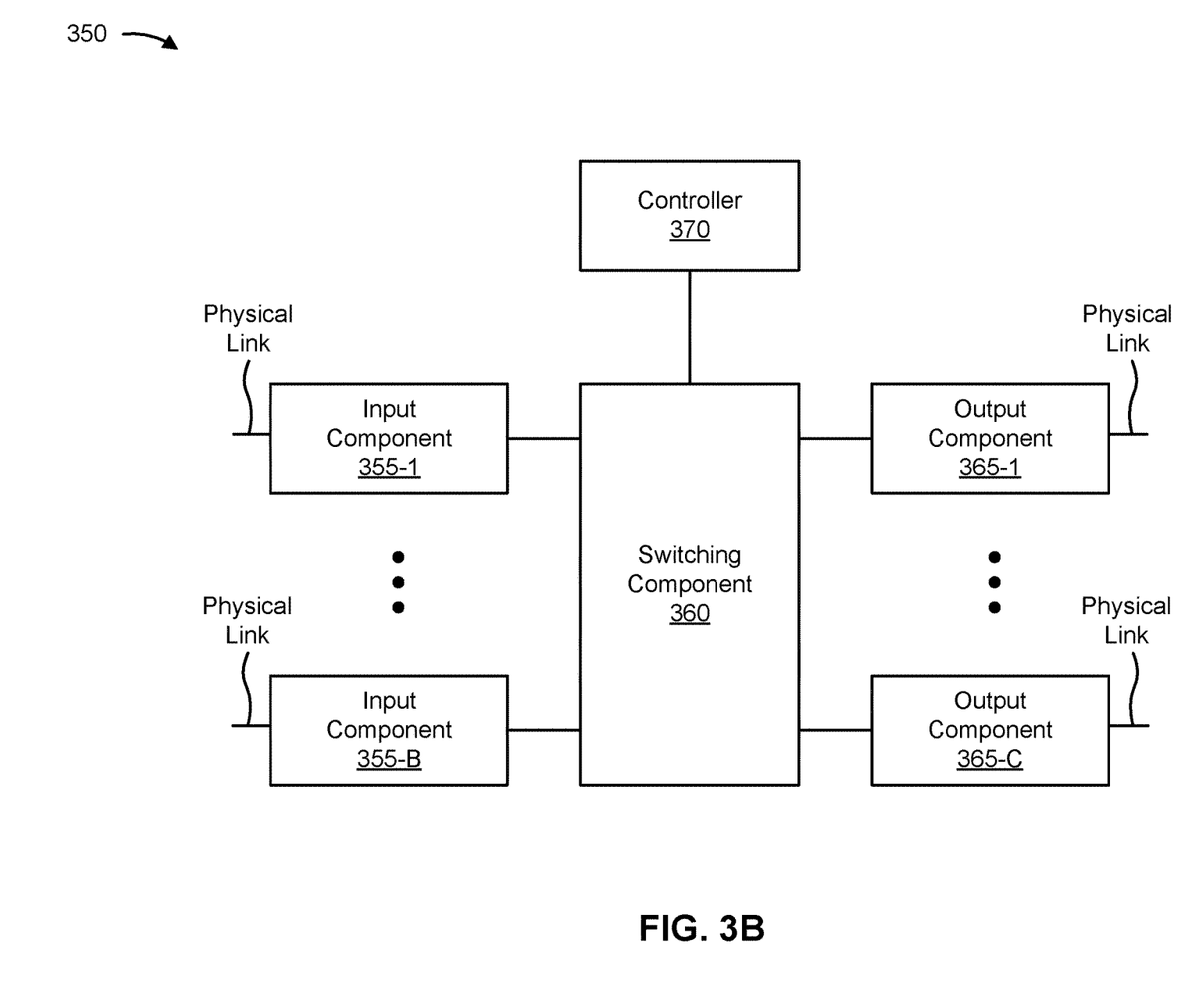
FIG. 3B is a diagram of example components of a device, such as one or more devices of FIG. 2.

FIG. 3B is a diagram of example components of a device, such as one or more devices of FIG. 2. Device 350 may correspond to a source network device 210 and/or destination network device 220. In some implementations, source network device 210 and/or destination network device 220 may include one or more devices 350 and/or one or more components of device 350. As shown in FIG. 3B, device 350 may include one or more input components 355-1 through 355-B (B≥1) (hereinafter, and with respect to FIG. 3B, referred to collectively as input components 355, and individually as input component 355), a switching component 360, one or more output components 365-1 through 365-C (C≥1) (hereinafter, and with respect to FIG. 3B, referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, a FPGA, an ASIC, and/or another type of processor. As indicated above, a processor is implemented in hardware, firmware, or a combination of hardware and software. In some implementations, controller 370 may include one or more processors that can be programmed to perform a function.

In some implementations, controller 370 may include a random access memory (RAM), a read only memory (ROM), and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 350 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350. In some implementations, various components of FIGS. 3A and 3B may be interchangeable in some devices, such as device 300 and/or device 350.

Figure 4:
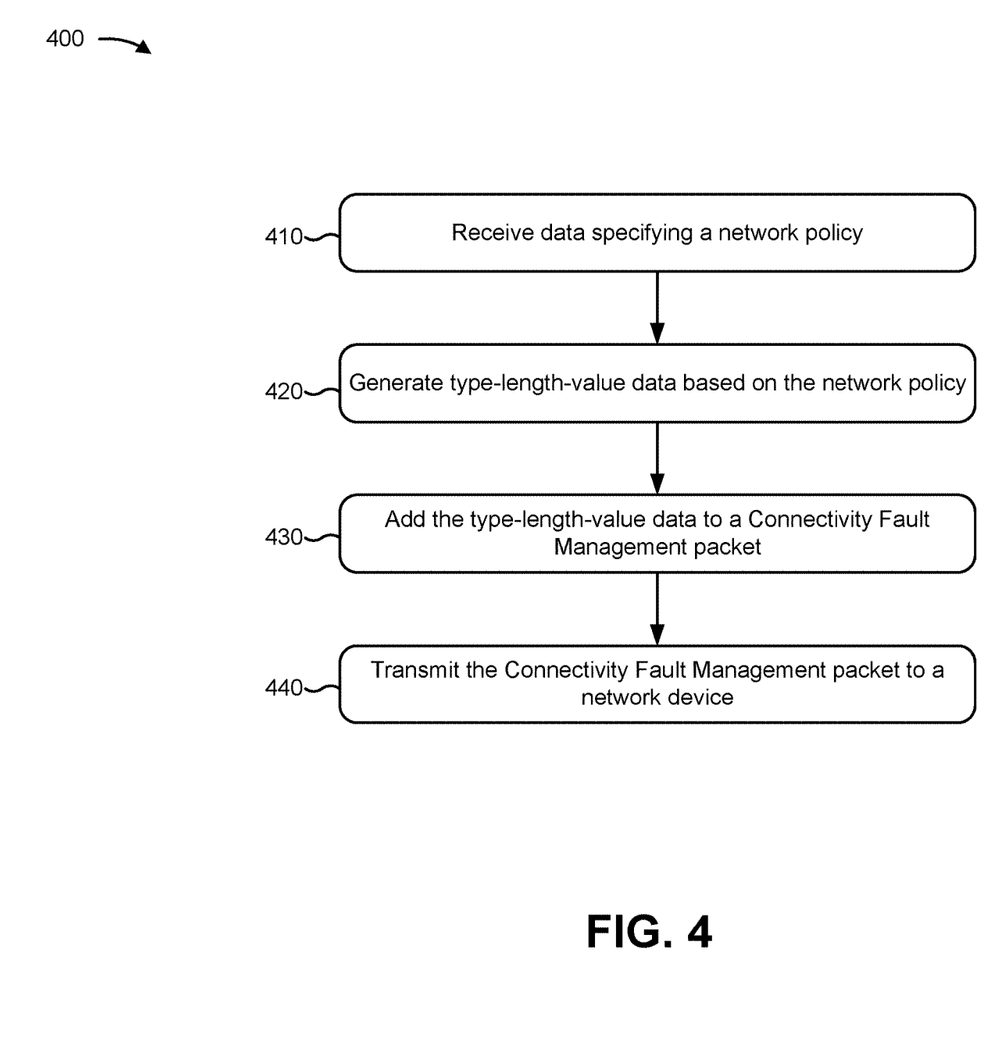
FIG. 4 is a flow chart of an example process for distributing a network policy using connectivity fault management.

FIG. 4 is a flow chart of an example process 400 for distributing a network policy using connectivity fault management. In some implementations, one or more process blocks of FIG. 4 may be performed by source network device 210. In some implementations, one or more process blocks of FIG. 4 may be performed by another device or a group of devices separate from or including source network device 210, such as destination network device 220.

As shown in FIG. 4, process 400 may include receiving data specifying a network policy (block 410). For example, source network device 210 may receive (e.g., via input component 330 of FIG. 3A or input component 355 of FIG. 3B) data specifying a network policy. The network policy may include data defining the manner in which particular network traffic should be handled. For example, the network policy may include matching criteria, such as a network address (e.g., Internet protocol address, MAC address, a source address, a destination address, and/or the like), and one or more actions (e.g., discard, block, forward, mirror, log, quarantine, flag for further analysis, and/or the like) to be performed on network traffic that matches the matching criteria. The network policy may come from a variety of sources, including another device, user input, another component of source network device 210 (e.g., a network intrusion detection component may generate the network policy in response to detecting a threat), and/or the like.

The network policy may be applied by the source network device 210. For example, one or more components of the source network device 210 (e.g., processor 315, controller 370, one or more processors of input component 355 or output component 365, and/or the like) may be configured to implement the network policy. By way of example, a line card processor included in source network device 210 may apply the received network policy.

In this way, source network device 210 may receive data specifying a network policy, enabling source network device 210 to generate TLV data that specifies the network policy.

As further shown in FIG. 4, process 400 may include generating TLV data based on the network policy (block 420). For example, source network device 210 (e.g., processor 315, controller 370, one or more processors of input component 355 or output component 365, and/or the like) may generate TLV data based on the network policy. TLV data includes data having a particular type-length-value format, where the first portion indicates a type of the TLV data, the length indicates the length of the TLV, and the value is the information to be transmitted (e.g., data specifying a network policy). The CFM protocol provides a space in CCM packets and ETH-AIS packets for TLV data.

In some implementations, source network device 210 generates the TLV data based on a predetermined TLV format for data specifying a network policy. For example, a predetermined format for the value portion of the TLV data may specify matching criteria to be placed before the action to be taken, separated by a delimiter. The foregoing format is one example, but other formats may also be used for TLV data to specify a network policy. Based on the TLV format, source network device 210 may convert the network policy to the appropriate TLV format to generate the TLV data.

In some implementations, multiple network policies may be specified by TLV data. For example, multiple network policies may be included in TLV data by appending network policies to one another. Source network device 210 may include multiple network policies in TLV data, for example, in a situation where source network device 210 has been provided with multiple network policies.

In this way, source network device 210 may generate TLV data based on the network policy, enabling source network device 210 to include the TLV data in a CFM packet for transmission to one or more other devices, such as destination network device 220.

As further shown in FIG. 4, process 400 may include adding the TLV to a CFM packet (block 430). For example, source network device 210 (e.g., processor 315, controller 370, one or more processors of input component 355 or output component 365, and/or the like) may add the TLV data to a CFM packet. The CFM packet may include, for example, a CCM packet and/or an ETH-AIS packet. In a situation where a CFM session exists between source network device 210 and destination network device 220, CCM packets are periodically sent between the source network device 210 and destination network device 220 (e.g., to provide a "heartbeat" indicating that source network device 210 is active). ETH-AIS packets are typically sent based on the detection of an error or fault in one or more network devices, and can be used, for example, by source network device 210 to notify destination network device 220 that another network device has failed, or that another network which was previously disabled has become active again.

In some implementations, source network device 210 includes the TLV data in a CCM packet. A CCM packet includes a space for TLV data in which source network device 210 may include the TLV data generated above (e.g., at block 420). Due to the periodic nature of transmitting CCM packets for a CFM session, in some implementations, source network device 210 may include the TLV data in all CCM packets or a subset of CCM packets. For example, in some implementations the existence of TLV data that specifies a network policy may be used to indicate when the network policy should be applied and when the network policy should be terminated. For example, destination network device 220, which may implement the network policy based on receiving a CCM packet including TLV data specifying the network policy, may terminate the network policy based on receiving a CCM packet that does not include the TLV data specifying the network policy. In this way, source network device 210 may use the periodic nature of CCM packets to both enable and disable implementation of a network policy.

In some implementations, source network device 210 includes the TLV data in an ETH-AIS packet. An ETH-AIS packet includes a space for TLV data in which source network device 210 may include the TLV data generated above (e.g., at block 420). In some implementations, source network device 210 may both enable and disable implementation of a network policy using ETH-AIS packets, e.g., a first ETH-AIS packet including the TLV data to enable the network policy on destination network device 220, and a second ETH-AIS packet sent with no TLV data, or sent with predetermined data that indicates, to destination network device 220, that the network policy should be disabled. In this way, source network device 210 may use ETH-AIS packets to enable and disable implementation of a network policy.

In some implementations, source network device 210 may determine in which type of packet (e.g., CCM or ETH-AIS) the TLV data is to be included. For example, the determination may be made based on user input, such as an administrator preference. As another example, the determination may be made based on the intended target for the network policy specified by the TLV. Source network device 210 typically transmits CCM packets to peer CFM devices (e.g., other network devices with an active CFM session between source network device 210 and the other network devices), while ETH-AIS packets may be transmitted to non-peer CFM devices (e.g., a network device with which source network device 210 has no direct CFM session, but with which a peer CFM device of source network device 210 does have an active CFM session). Accordingly, the choice of a CCM packet or ETH-AIS packet may depend on the intended devices to which the network policies are to be applied (e.g., based on administrator input, predetermined configuration, and/or the like).

In some implementations, source network device 210 may include TLV data in both a CCM packet and an ETH-AIS packet. In some implementations, source network device 210 may be configured to use one type of CFM packet to enable a network policy and a different type of CFM packet to disable the network policy (e.g., a CCM packet to enable the network policy and an ETH-AIS packet to disable the network policy).

In this way, source network device 210 may add the TLV data to a CFM packet, enabling source network device 210 to transmit the CFM packet to destination network device 220.

As further shown in FIG. 4, process 400 may transmitting the CFM packet to a network device (block 440). For example, source network device 210 (e.g., output component 335, output component 365, and/or the like) may transmit the CFM packet to destination network device 220 (e.g., via network 230). In a situation where the TLV data is included in a CCM packet, the CCM packet may be sent periodically in accordance with the CFM protocol, which may cause the CCM packet including the TLV data to be automatically transmitted to peer CFM devices, such as destination network device 220. In a situation where the TLV data is included in an ETH-AIS packet, source network device 210 may transmit the ETH-AIS packet when the ETH-AIS packet has been generated. The ETH-AIS packet may also be transmitted to peer CFM devices, such as destination network device 220, and the peer CFM devices may forward the ETH-AIS packet to other peer devices (e.g., another destination network device 220 that is a peer CFM device of the destination network device 220, but not a peer CFM device of source network device 210).

As noted above, in some implementations, source network device 210 may transmit multiple CFM packets. For example, CCM packets that include the TLV data may be periodically transmitted with the TLV data specifying the network policy until the network policy is removed from source network device 210 (e.g., by an administrator and/or based on another component of source network device 210). Based on the removal of the network policy from source network device 210, source network device 210 may cease including the TLV data specifying the network policy in the CCM packets that source network device 210 transmits to its peer CFM devices, such as destination network device 220. In some implementations, when destination network device 220 receives CCM packets that no longer include the network policy, destination network device 220 may disable the network policy. In a situation where source network device 210 transmits an ETH-AIS packet with the TLV data, one ETH-AIS packet may be sent to enable the network policy, and a subsequent ETH-AIS packet may be sent to disable the network policy.

In this way, source network device 210 may transmit the CFM packet, enabling destination network device 220 to receive the CFM packet and enable and/or disable network policies based on the TLV data included in the CFM packet.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
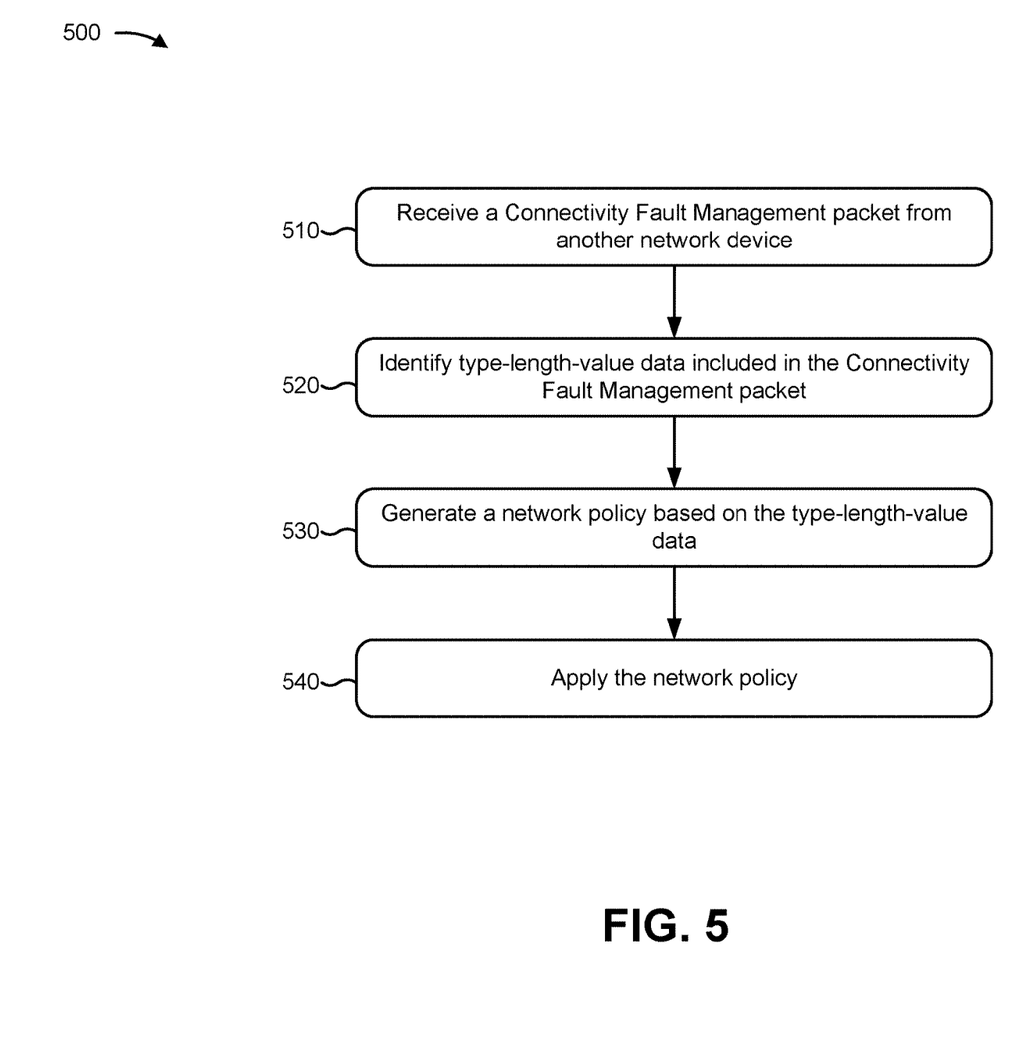
FIG. 5 is a flow chart of an example process for implementing a network policy provided using connectivity fault management.

FIG. 5 is a flow chart of an example process 500 for implementing a network policy provided using connectivity fault management. In some implementations, one or more process blocks of FIG. 5 may be performed by destination network device 220. In some implementations, one or more process blocks of FIG. 5 may be performed by another device or a group of devices separate from or including destination network device 220, such as source network device 210 or another destination network device 220. For example, the process 500 may be performed by destination network device 220 based on receiving a CFM packet that includes TLV data specifying a network policy and that was transmitted to destination network device 220 by source network device 210, e.g., as described above with respect to FIG. 4 and process 400.

As shown in FIG. 5, process 500 may include receiving a CFM packet from a network device (block 510). For example, destination network device 220 may receive (e.g., via input component 330, input component 355, and/or the like) a CFM packet from source network device 210. In some implementations, the CFM packet may be transmitted to destination network device 220 in a manner similar to that described above with respect to block 440. For example, the CFM packet may be a CCM or ETH-AIS packet that includes TLV data specifying a network policy, and which is received by destination network device 220 based on destination network device 220 being a peer CFM device of source network device 210 (or, by being an indirect peer of source network device 210).

In this way, destination network device 220 may receive a CFM packet from a network device, enabling destination network device 220 to identify TLV data included in the CFM packet and use the TLV data to enable (or disable) a network policy.

As further shown in FIG. 5, process 500 may include identifying TLV data included in the CFM packet (block 520). For example, destination network device 220 (e.g., processor 315, controller 370, one or more processors of input component 355 or output component 365, and/or the like) may identify TLV data included in the CFM packet. In some implementations, the TLV data may have been included in the CFM packet in a manner similar to that described above with reference to block 430 of FIG. 4. Destination network device 220 may identify the TLV data based on the TLV data being included in a portion of a CCM or ETH-AIS packet that is set aside for TLV data. In some implementations, the type associated with the TLV data may indicate that the TLV data is intended for destination network device 220 (e.g., by indicating that the TLV data is of the type for organization specific TLV data, or data intended for destination network device 220). In addition, in some implementations the TLV data may be received by a CFM session operating on destination network device 220, enabling the CFM packet to serve a purpose beyond delivery of the TLV data (e.g., to serve as a "heartbeat" and/or an alarm).

In this way, destination network device 220 may identify TLV data included in a CFM packet, enabling destination network device 220 to generate and apply a network policy included in the TLV data.

As further shown in FIG. 5, process 500 may include generating a network policy based on the TLV data (block 530). For example, destination network device 220 (e.g., processor 315, controller 370, one or more processors of input component 355 or output component 365, and/or the like) may generate a network policy based on the TLV data. For example, the TLV data may specify a network policy in a particular format intended for transmission via a CFM packet (e.g., as described above with respect to block 420).

In some implementations, as also described above, the TLV data may specify multiple network policies.

In a manner similar to that in which source network device 210 translated the network policy into value data for the TLV data, destination network device 220 may translate the value portion of the TLV data into the network policy (or network policies) by parsing the TLV data and generating the network policy in accordance with the matching criteria and action included in the TLV data. By way of example, the CFM session operating on destination network device 220 may parse the value portion of the TLV data and generate a rule designed to be applied on the forwarding plane of destination network device 220 (e.g., in a manner designed to discard, block, forward, mirror, quarantine, flag for further analysis, and/or log network traffic that matches a particular network address).

In this way, destination network device 220 may generate a network policy based on the TLV data, enabling destination network device 220 to apply the network policy.

As further shown in FIG. 5, process 500 may include applying the network policy (block 540). For example, destination network device 220 (e.g., processor 315, controller 370, one or more processors of input component 355 or output component 365, and/or the like) may apply the network policy. In some implementations, destination network device 220 may apply the network policy similar to the manner in which source network device 210 applies a network policy (e.g., as described with respect to block 410). For example, a CFM session operation on destination network device 220 may apply the network policy by applying the network policy to one or more components of destination network device 220 designed to implement the network policy, such as an input component 355 and/or output component 365 included in the forwarding plane of destination network device 220.

In some implementations, TLV data may specify multiple network policies that are to be applied to destination network device 220. In this situation, destination network device 220 may apply each network policy that was generated based on the TLV data. In some implementations, TLV data specifying the network policy or policies is included in a CCM packet. In this situation, destination network device 220 may continue to implement the network policy or policies until destination network device 220 receives a CCM packet that does not include the network policy or network policies. For example, in a situation where the TLV data included in periodically received CCM packets specifies two network policies, destination network device 220 may implement both network policies until one network policy is removed from the TLV data, in which case the removed network policy may be disabled by destination network device 220. In some implementations, TLV data specifying the network policy or policies may be included in an ETH-AIS packet. In this situation, destination network device 220 may implement the network policy or policies until an ETH-AIS packet is received with TLV data indicating that one or more of the network policies should be disabled.

In this way, destination network device 220 may apply the network policy generated from the TLV data, enabling destination network device 220 to implement network policies that are received via CFM.

In some implementations, process 500 may include forwarding a CFM packet that includes TLV data specifying a network policy. For example, destination network device 220 may forward an ETH-AIS packet that was received from source network device 210. While destination network device 220 may not typically forward CCM packets because CCM packets may be frequently transmitted and intended to provide a "heartbeat" for the device from which the CCM packets originate, ETH-AIS packets may be transmitted. For example, destination network device 220 may receive TLV data specifying a network rule in an ETH-AIS packet and forward that ETH-AIS packet (or generate a duplicate ETH-AIS packet to transmit) to peer CFM devices of destination network device 220, which may include other destination network devices 220. In this way, network policies may be distributed to network devices that are not direct CFM peers.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

While process 400 of FIG. 4 is described as being performed by source network device 210, and process 500 of FIG. 5 is described as being performed by destination network device 220, either device may perform either or both processes. For example, a source network device 210 and/or destination network device 220 may each perform both processes 400 and 500, e.g., enabling both devices to send and/or receive CFM packets including TLV data that specifies one or more network policies.

In this way, network devices (such as source network device 210 and/or destination network device 220) may be capable of distributing network policies to other network devices using CFM packets, enabling the recipient network devices to implement the network policies as well. The ability to distribute network policies using CFM may facilitate relatively quick distribution of network policies in a manner designed to minimize the involvement of a network administrator or other mechanisms for distributing network policies. The ability to quickly distribute (and end) network policies may increase the likelihood that network policies may be spread quickly enough to secure other network devices before threats to one network device can spread. By using an existing CFM session and CFM protocol, the distribution of network policies may be compatible with many network devices, both within and outside of the administrative domain that includes the network device on which the network policy first implemented. Accordingly, network devices that distribute network policies using CFM may conserve significant resources, both human resource and computing resources, which might otherwise be spent on activating and deactivating network policies on various network devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more input components; and
one or more processors, implemented at least partially in hardware, to:
receive, via at least one of the one or more input components, first data specifying a network policy, the first data specifying:
a matching criteria, and
an action to be performed on network traffic that matches the matching criteria;
generate, after receiving the first data, type-length-value (TLV) data based on the matching criteria and the action,
a value portion of the TLV data including second data,
the second data being formatted for inclusion in the value portion of the TLV data and specifying the matching criteria and the action;
add the TLV data to a Connectivity Fault Management (CFM) packet, wherein the CFM packet includes a continuity check message (CCM) packet of CCM packets that are periodically sent between the device and a separate device to which the network policy is to be applied; and
transmit the CFM packet to the separate device to cause the separate device to implement the network policy by identifying the network policy based on the TLV data.

2. The device of claim 1, where the CCM packet is to be scheduled for delivery to the separate device as part of a CCM transmission operation.

3. The device of claim 1, where the CFM packet further includes an Ethernet Alarm Indication Signal (ETH-AIS) packet.

4. The device of claim 1, where the separate device is connected to the device via a CFM session.

5. The device of claim 1, where the matching criteria includes a network address.

6. The device of claim 1, where the action includes one or more of:
   discard;
   block;
   forward;
   mirror;
   quarantine;
   flag for further analysis; or
   log.

7. The device of claim 1, where the one or more processors are further to:
   receive third data specifying a second network policy; and
   include, in the value portion of the TLV data, fourth data specifying the second network policy.

8. A network device, comprising:
   one or more input components; and
   one or more processors to:
   receive, from a separate network device, a Connectivity Fault Management (CFM) packet, wherein the CFM packet includes a continuity check message (CCM) packet of CCM packets that are periodically sent between the separate network device and the network device;
   identify type-length-value (TLV) data included in the CFM packet,
      a value portion of the TLV data including data, formatted for inclusion in the value portion of the TLV data, specifying:
         a matching criteria, and
         an action to be taken on network traffic that matches the matching criteria;
   generate, after receiving the CFM packet, a network policy based on the TLV data,
      the network policy being implemented on a separate network device, and
      the network policy including:
         the matching criteria, and
         the action; and
   apply the network policy.

9. The network device of claim 8, where the one or more processors, when receiving the CFM packet, are to: receive the CCM packet as part of a scheduled CCM transmission.

10. The network device of claim 8, where the CFM packet further includes an Ethernet Alarm Indication Signal (ETH-AIS) packet.

11. The network device of claim 10, where the one or more processors are further to:
   forward the ETH-AIS packet to a third network device.

12. The network device of claim 8, where the separate network device is connected to the network device via a CFM session.

13. The network device of claim 8, where the matching criteria includes a network address.

14. The network device of claim 8, where the action includes one or more of:
   discard;
   block;
   forward;
   mirror;
   quarantine;
   flag for further analysis; or
   log.

15. The network device of claim 12, where the one or more processors, when applying the network policy, are to:
   apply the network policy using the CFM session.

16. The network device of claim 8, where:
   the value portion of the TLV data includes data specifying:
      a second matching criteria, and
      a second action; and
   the one or more processors are further to:
      generate a second network policy based on the TLV data,
         the second network policy including:
            the second matching criteria, and
            the second action.

17. The network device of claim 8, where the one or more processors are further to:
   receive, from the separate network device, a different CFM packet,
      the different CFM packet including data indicating that the network policy is no longer to be used; and
   disable the network policy based on receiving the different CFM packet.

18. A method, comprising:
   receiving, by a network device, first data specifying a network policy,
      the first data specifying a matching criteria and an action to be performed on network traffic that matches the matching criteria;
   adding, by the network device and after receiving the first data, second data to a a Connectivity Fault Management (CFM) packet, wherein the CFM packet includes a continuity check message (CCM) packet of CCM packets that are periodically sent between the network device and a separate network device to which the network policy is to be applied,
      the second data being formatted for inclusion in a value portion of type-length-value (TLV) data, and
      the second data specifying the matching criteria and the action; and
   transmitting, by the network device, the CFM packet to the separate network device to cause the separate network device to implement the network policy by identifying the network policy based on the TLV data.

19. The method of claim 18, wherein the CFM packet is transmitted using a CFM session.

20. The method of claim 18, further comprising:
   transmitting a different CFM packet, that does not include the TLV data to cause the separate network device to terminate the network policy based on receiving the different CFM packet that does not include the TLV data.

* * * * *